HIGH SPEED TAPE PUNCH

Filed Oct. 2, 1957 2 Sheets-Sheet 1

INVENTOR.
JOSEPH E. LISINSKI
BY Marshall M. Truex
ATTORNEY

July 26, 1960 J. E. LISINSKI 2,946,381
HIGH SPEED TAPE PUNCH
Filed Oct. 2, 1957 2 Sheets-Sheet 2

United States Patent Office 2,946,381

Patented July 26, 1960

2,946,381

HIGH SPEED TAPE PUNCH

Joseph E. Lisinski, Poughkeepsie, N.Y., assignor to International Business Machines Corporation, New York, N.Y., a corporation of New York Filed Oct. 2, 1957, Ser. No. 687,695

1 Claim. (Cl. 164—115)

Figures 1A, 1B:
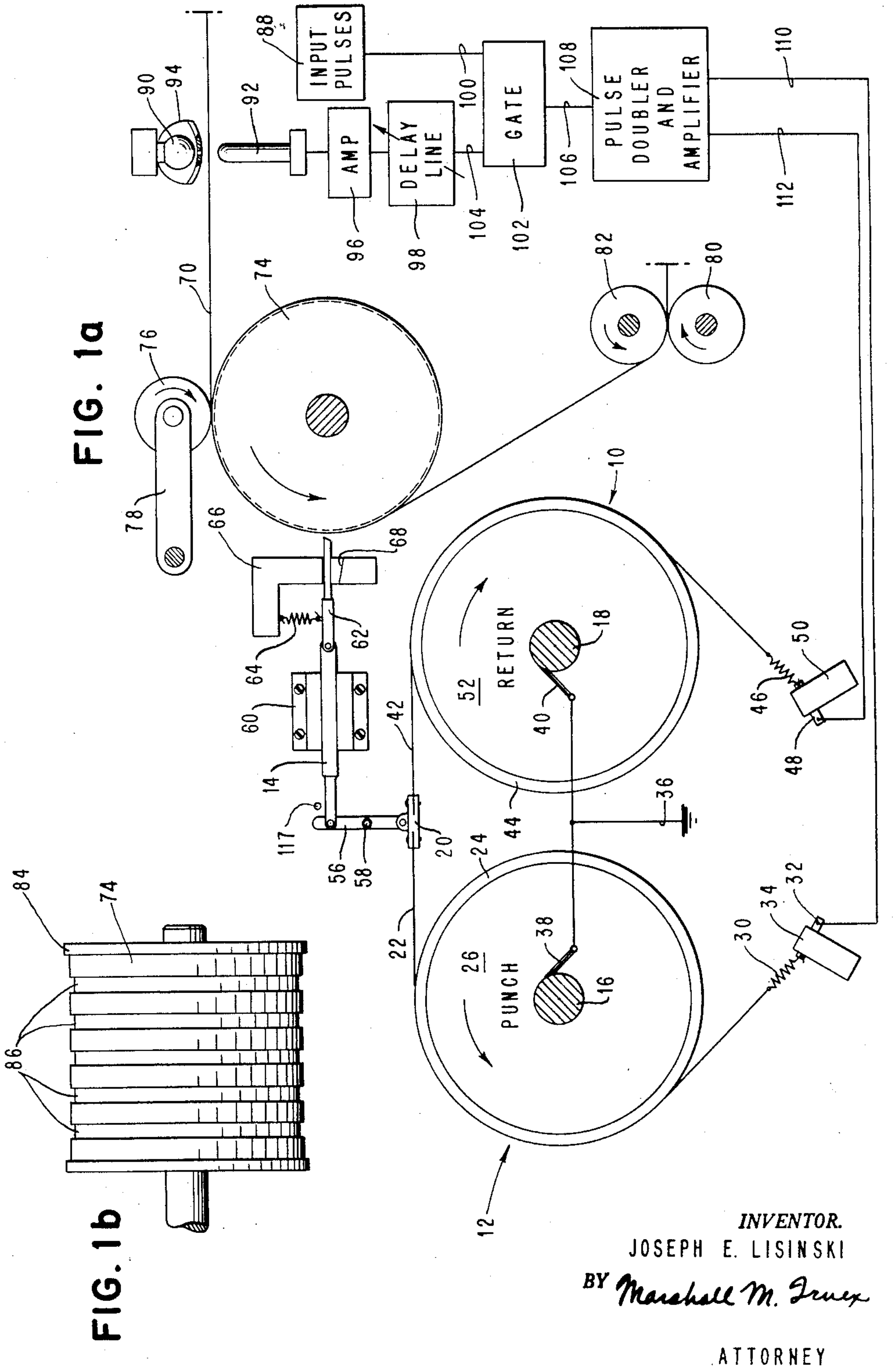

This invention relates to high speed punching apparatus and more particularly to a punching device employing electrostatic clutches to record data in the form of perforations in a continuously moving tape.

The operation of electrostatic clutches depends upon the electroadhesive forces between a conductive member and a cooperating semiconductive member when a voltage is applied across the members. Usually, a driven member of conductive material and a driving member of semiconductive material are engaged and the driven member slips in the absence of a potential and adheres to the driving member when a potential is supplied to the pair. Response time is of the order of microseconds.

Briefly stated, a punch is driven through a tape with an electrostatic clutch in response to actuation from a data source and is then restored to a rest position by a second electrostatic clutch arranged to operate sequentially with the first clutch. Instead of feeding the tape in column cycles, the tape is moved continuously and perforated in flight at high speed by limiting punch penetration through the tape and by permitting the punch to move slightly in the direction of tape movement.

It is an object of this invention to provide an improved high speed tape punch.

It is another object of this invention to provide a punch which is operated by electroadhesive clutches.

It is another object of this invention to provide a clutch wherein a punch is driven through the tape by one clutch and is returned to its position of rest by another clutch.

It is another object of this invention to provide an improved tape punch in which the tape is moved continuously past the tape punches, and the punches perforate the tape while the latter is moving.

It is another object of this invention to provide a tape punching device in which proper registration between the feed holes or other indicia and the data holes is achieved through synchronizing the data rate with the movement of the indicia.

It is a further object of this invention to provide tape punching apparatus having a punch mechanism for continuously feeding a tape past a die and stripper, a member arranged for reciprocation connected to the punch, a pair of clutches responsive to the application of a voltage, one clutch for driving the reciprocable member in a direction such that the punch is caused to enter the tape, the other of the clutches causing the return of the reciprocable member to remove the punch from the tape, and apparatus actuated from feed holes in the tape for causing a voltage to be applied first to one clutch and then to the other clutch.

Other objects of the invention will be pointed out in the following description and claim and illustrated in the accompanying drawings, which disclose, by way of example, the principles of the invention and the best mode, which has been contemplated, of applying that principle.

In the drawings:

Figure 1*a* is a diagrammatic view of the tape punching apparatus.

Figure 1*b* is a side view of the die shown in Figure 1*a*.

Figure 2:
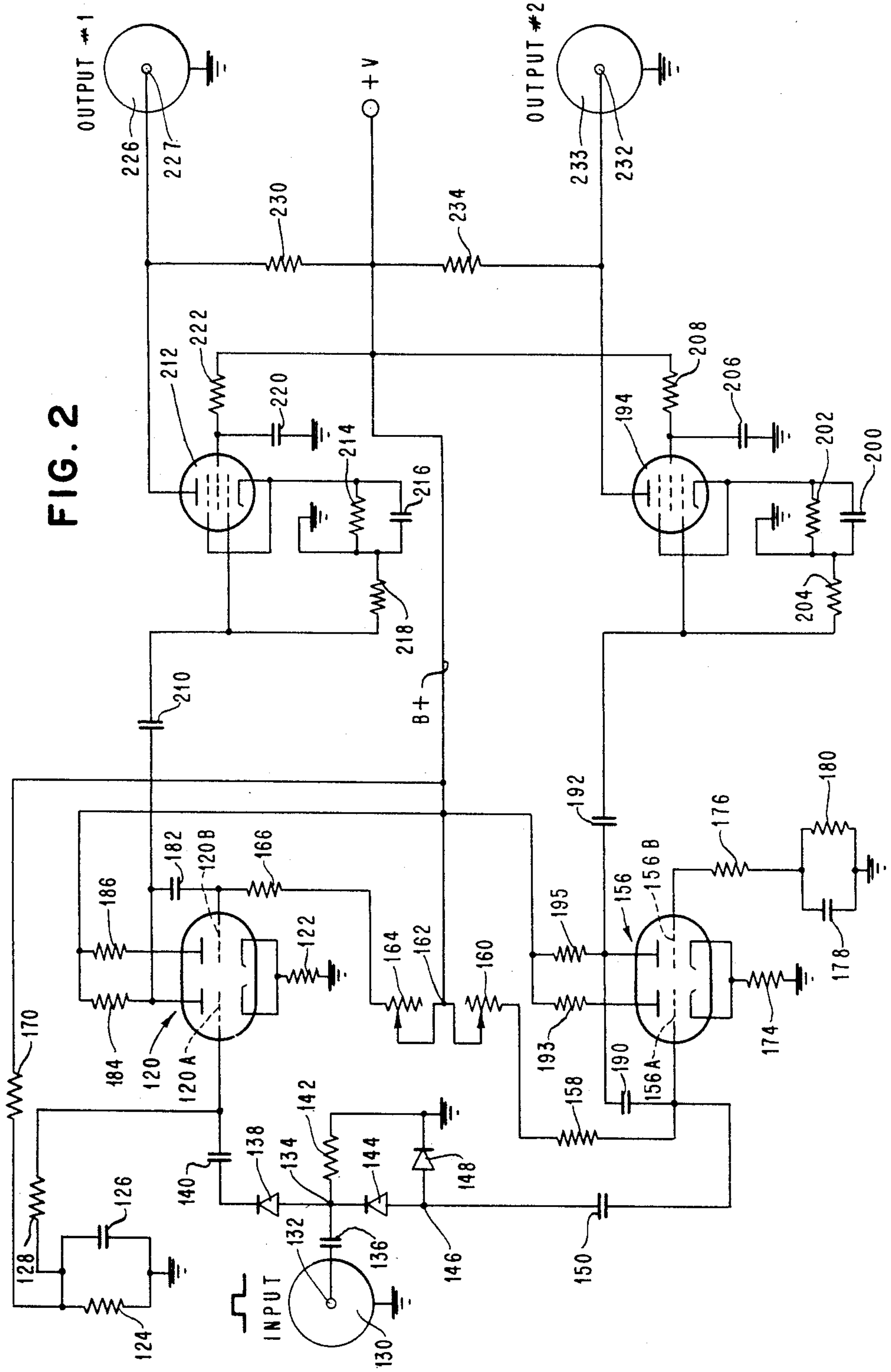

Figure 2 is a circuit diagram of the pulse doubler and amplifier shown in block form in Figure 1*a*.

In Figure 1*a*, the clutches 10 and 12 are used to impart a reciprocating movement to a driven member 14 utilizing the torque of a constantly rotating driving shaft 16 for movement in the punching direction and a constantly rotating driving shaft 18 for movement in the restore or return direction. A member 20 of insulating material is attached to a clutch band or strip 22 of a flexible conductive material, which may be a thin strip of steel. The band 22 is flexed around a portion of the periphery of a rim or clutch face 24 made of a suitable semiconductive material such as a mixture of rubber, a filler such as asbestos, conductive particles such as carbon black, and a phenolic resin. The clutch face 24 is supported by a drum or cylinder 26 made of conductive material such as aluminum or brass affixed to the shaft 16 and rotatable therewith in a counterclockwise direction. The end of the band 22 opposite the member 20 is connected to a spring 30, the latter being connected to a suitable terminal 32 mounted on insulating support 34 affixed to a portion of the machine base. The clutch rim 24 and the band 22 are adapted to be energized by the application of a suitable potential between the band 22 and the drum 26. A common connection 36 is made from ground to each of a pair of brushes 38 and 40, the latter completing circuits to the rotating drum shafts 16 and 18 respectively. Another strip 42, similar to the one 22, is connected to another side of the member 20 and is wound about a clutch face 44 of semiconductive material. The other end of the strip 42 is connected to a spring 46, the latter being connected to a terminal 48 mounted in an insulating bracket 50. A cylinder 52 supports the semiconductive material 44 and is connected to the shaft 18 for rotation therewith in clockwise direction.

An arm 56 is pivotally supported about a fixed point 58, and one end is pivotally connected to the member 20 while the other end is pivotally connected to the arm 14. Upon movement of the tape 22 from right to left and subsequent movement of the tape 42 from left to right, the arm 14, which is slidably received in a fixed guide 60, is caused to reciprocate. Pivotally connected to the other end of the slide 14 is a punch 62 which is biased by a spring 64, the latter being attached to a portion of a stripper 66. A slot 68 in the stripper 66 permits pivotal movement of the punch 62; however, in the rest and perforating positions the punch 62 is normally biased by the spring 64 against the upper edge of the opening 68. A tape 70 having feed holes substantially at the longitudinal center of the tape is passed over a die 74 of cylindrical shape and is held thereto by a roller 76 rotatably coupled to an arm 78. The arm 78 is pivotally coupled to a fixed pin on the base of the machine and the weight of the combination is sufficient to provide a slight resistance to the movement of the tape 70. A pair of feed rollers 80 and 82 engage the tape to pull the latter over the die 74 and past the punch 62. As shown in Figure 1*b*, the die 74 has guides 84 to prevent lateral movement of the tape and has grooves 86 which permit the punch 62 and other adjacently mounted punches (not shown) to penetrate the tape by a small amount. Tape is usually provided with feed perforations which may be preformed in the tape or may be placed in the tape at the time data is entered therein. In the embodiment shown, tape having preformed feed perforations is used, and the feed perforations are utilized to synchronize the input data with tape movement so that proper registration of feed perforation with data perforations is provided. This is to say that both classes of perforations must bear a fixed lateral reference with each other in order that a tape reading or sensing device may read the tape accurately.

To provide for the recording of the data in the tape by means of the mechanism of the present invention, a circuit is provided whereby movement of the tape provides a gate for the input data pulses 88. A lamp 90 is continuously supplied with a voltage (not shown) when the punching device is in operation, and the light given off is arranged to pass through the feed perforations in the tape 70 by means of a mask 94 with an aperture which directs the light to an area on the tape which contains only one feed hole. The light is directed through the hole to a light sensitive tube 92, which tube generates a voltage when light is present on a photosensitive plate by the well known photoelectric effect. Accordingly, as the tape 70 is passed from right to left, feed perforations provide pulses of light from the lamp 90 which are applied to the phototube 92. The output of the phototube 92 is a series of pulses which are amplified by an amplifier 96 and coupled to a delay device 98 which is adjustable to delay the pulse at least for the period of time it takes for the passage of one feed hole past the mask 94 to the next feed hole.

An input data pulse is applied on a line 100 to an electronic gate 102 and the output of the delay device 98 is applied to another input of the gate 102 on a line 104. The gate 102 may be of any well known type wherein the coincident application of pulses at the inputs 100 and 104 provide a single pulse at an output line 106. Well known examples are coincidence tube circuits and diode AND circuits. In this instance, an input pulse from the line 100 and an input pulse from the line 104 provide an output pulse on the line 106 to a pulse doubler and amplifier 108. The pulse doubler and amplifier provides a pulse of predetermined duration at the line 110 and after the termination of the pulse on the line 110 generates a pulse on the line 112 of the same polarity and of substantially the same duration. The details of the pulse doubler and amplifier 108 are discussed with reference to Figure 2 and the pulse durations are discussed hereafter when the action of the electrostatic clutches is explained with relation to the punch 62.

When a pulse is provided on the line 110, a difference of potential exists between the tape 22 and the drum 26, the latter being connected to chassis or ground. Normally, the tape 22 slides on a semiconducting surface 24 which is lubricated with a high dielectric lubricant such as silicon grease or the like. However, upon application of the voltage pulse on the line 110, the tape adheres to the surface 24 and moves counterclockwise about the shaft 16. The member 56 is pivoted clockwise about the point 58 thereby driving the sliding member 14 from left to right. The pulse applied from the line 110 to electrostatic clutch 12 is of a very short duration and just sufficient to cause the punch 62 to penetrate the tape and enter the die 74 by a very slight amount. When this is accomplished, a pulse from the line 112 is applied to the terminal 48 and the tape 42 through the spring 46. Accordingly, a difference of potential exists between the drum 52 and the tape 42 across the semiconductive material 44. The torque has now been removed from the tape 22 and is now applied to the tape 42 which moves clockwise about the shaft 18 with the drum. Accordingly, the arm 56 is pivoted counterclockwise about the pin 58 to its normal position withdrawing the slide 14 and, in turn, the punch 62 from the tape and the die 74. It will be recognized that the tape 70 has moved by some small amount during the time that the punch 62 has entered the tape and been withdrawn. However, the punch is free to move downwardly with the tape against the action of the spring 64. Thereafter, the punch is withdrawn from the tape by the slide 14, and the spring 64 restores the punch 62 to its normal position in engagement with the upper surface of the slot 68. A stop pin 117 may be used to limit movement of the arm 56, but is not required as will become evident hereafter.

For the best operation, perforations are placed in the tapes 22 and 42 to provide greater flexibility of the latter and further to permit the lubricant to flow from between the drum and the tape and thereby provide a more uniform coating.

The preferred polarity for the electrostatic clutches is to have the tape positive with respect to the semiconductor. Accordingly, the output pulses of the pulse doubler are positive with respect to ground for each clutch.

In Figure 2 there is shown the circuit diagram of the pulse doubler and amplifier shown generally as unit 108 in Figure 1*a*. A dual triode tube 120 having left and right-hand triodes 120A and 120B respectively have their cathodes connected to a common end of an 820 ohm resistor 122, the latter having its other end connected to a ground. A 1 kilohm resistor 124 is connected in parallel with a 1000 micromicrofarad condenser 126 and one end of the parallel combination is connected to ground while the other end of the parallel combination is connected through a 30 kilohm resistor 128 to the grid of the triode 120A. The outer conductor 130 of the input cable is connected to ground, and the inner conductor 132 is connected to a terminal 134 through a 1000 micromicrofarad condenser 136. The plate of a diode 138 is connected to the terminal 134 and the cathode of the diode is connected to one terminal of a 1000 micromicrofarad condenser 140, the other end of the latter being connected to the grid of the triode 120A. A 10 kilohm resistor 142 is connected between the terminal 134 and ground, and a diode 144 has its cathode connected to the terminal 134 and its plate connected to a terminal 146. Another diode 148 has its plate connected to the terminal 146 and its cathode connected to ground. A 1000 micromicrofarad condenser 150 is connected from the terminal 146 to the grid of a left-hand triode 156A of a tube 156. The grid of the triode 156A is connected to the right-hand grid of the triode through the following elements connected in series: a 150 K resistor 158, a 1 megohm potentiometer 160, the wiper of the potentiometer 160 to a terminal 162, the terminal 162 to the wiper on a 1 megohm potentiometer 164, and one end of the potentiometer 164 to a 150 K resistor 166. A 220 K resistor 170 is connected from a point between 1 K resistor 124 and 30 K resistor 128 to the terminal 162.

The cathodes of the triodes 156A and B are connected together to one end of an 820 ohm resistor 174, the other end of the resistor 174 being connected to ground. The grid of the triode 156B is connected to a 30 kilohm resistor 176 to a parallel combination of 1000 micromicrofarad condenser 178 and a 1 K resistor 180, the other end of the combination being connected to ground. The plate of the triode 120A is connected to the grid of the triode 120B through a 0.02 microfarad condenser 182 and to the terminal 162 through a 10 K resistor 184. The plate of the triode 120B is connected through a 10 K resistor 186 to the terminal 162. A 0.02 microfarad condenser 190 is connected between the grid of the triode 156A and the plate of the triode 156B and a .05 microfarad condenser 192 is connected between the plate of the triode 156B to a control grid of a pentode tube 194. A 10 kilohm resistor 193 is connected between the plate of the tube 156A and the terminal 162, and the plate of the triode 156B is connected through a 10 K resistor 195 to the terminal 162.

A suppressor grid of the pentode 194 is connected to the cathode, and the cathode in turn, is connected to ground through the parallel combination of 150 ohm resistor 202 and a 10 microfarad condenser 200. The control grid of the pentode 194 is connected to ground through a 470 K resistor 204. The screen grid of the pentode 194 is bypassed to ground through a 0.01 microfarad condenser 206 and is connected to the terminal 162 through a 15 K resistor 208. The plate of tube 120A is connected through a 0.05 microfarad condenser 210 to a control grid of another pentode 212. The suppressor grid of the pentode 212 is tied to the cathode, and the cathode is returned to ground through 150 ohm resistor 214 in parallel with a 10 microfarad condenser 216. The control grid of pentode 212 is connected to ground through 470 K resistor 218. The screen grid of tube 212 is returned to ground through a .01 microfarad condenser 220 and is connected to the terminal 162 through a 15 K resistor 222. An output cable has the outer conductor 226 tied to ground and an inner conductor 227 connected to the plate of the tube 212. The plate of the tube 212 is connected to the terminal 162 through a 9 K resistor 230. The plate of the pentode 194 is connected to the center conductor 232 of an output cable and the outer conductor 233 of the cable is connected to ground. The plate of the pentode 194 is connected to the terminal 162 through a 9 K resistor 234.

It will be noted that the terminal 162 is connected to a +140 volts D.C. which provides plate, screen grid, and biasing voltages. The filament supply is not shown, but it will be understood that the tubes used are of the hot cathode variety and that suitable heater voltage is provided. Each of the dual triodes 120 and 156 and their corresponding circuits comprise single-shot multivibrators which do not free run and must always be triggered for each output pulse. The balanced condition of the single-shot is established by the arrangement of biasing the tubes. More specifically, the grid of the triode 120B is connected to the positive supply voltage through the resistors 164 and 166, and the tube 120B is normally conducting in the absence of an input signal and has its grid substantially at cathode potential. The resultant voltage drop across the common cathode resistor 122 biases triode 120A to cut-off even though the voltage across the resistor 124 and condenser 126 reduces the effect of the cathode bias. When tube 120B is not conducting, the tube 120A cannot be cut-off by the self bias developed across the resistor 122.

A positive square wave is differentiated by the condenser 136 and resistor 142 and output signal is taken from across the resistor 142. The positive pulse is passed by the diode 138 and is impresesd on the grid of the triode 120A via the condenser 140 thereby raising the grid voltage above cut-off. The tube 120A begins to conduct and the voltage at its plate decreases which, in turn, passes through the condenser 182 and appears on the grid of the tube 120B as a negative-going voltage. This negative-going voltage on the grid decreases conduction through tube 120B, which reduces the cathode bias allowing more plate current to flow in the tube 120A. In this manner, the plate current of tube 120A is still further reduced and the grid of the tube 120A goes still more negative until the tube 120B is cut-off. The circuit remains in this state until the condenser 182 discharges sufficiently to permit the grid of tube 120B to rise above cut-off as determined by the time constant of condenser 182, the resistor 166 and the potentiometer 164. When the triode 120B begins to conduct, cathode biased is increased causing the current in triode 120A to decrease. This, in turn, increases the plate voltage of the triode 120A which is coupled to the grid of the triode 120B and the process continues until the multivibrator returns to the balanced condition. The negative output at the plate of triode 120A is applied to the grid of the amplifier tube 212 via the condenser 210.

The single-shot multivibrator comprising the triodes 156A and B and corresponding circuits operates in the same manner as the one previously described. In this instance, the triode 156A is conducting in the balanced condition, and the triode 156B is cut-off. The negative signal resulting from differentiation of the input signal is applied to the grid of 156A through the diode 144 and the condenser 150 causing the plate conduction to decrease. This action reduces the cathode bias developed across the resistor 174 permitting conduction of the triode 156B. The voltage at the plate of the triode 156B drops, and this negative voltage is fed back to the grid of the tube 156A via the condenser 190 and to the grid of the amplifier tube 194 by way of the condenser 192. The width of the negative pulse is determined by the RC time constant of the condenser 190, the resistor 158, and the potentiometer 160.

From this explanation thus far it is evident that the time between pulses applied to the control grids of the amplifier tubes 212 and 194 is determined by the duration of the input pulse and that the duration of the pulses applied to the amplifiers is determined by the RC time constants as discussed previously.

The amplifiers comprising the tube 194 and the tube 212 with their corresponding circuits are conventional and merely amplify and invert the signals applied thereto. Accordingly, when a positive going square wave is applied to the inputs 130 and 132, the resultant output is a positive pulse at the output #1 (226, 227) followed by a positive pulse at the output #2 (233, 232). Thus, pulses as previously described are applied to lines 110 and 112 in Figure 1*a* and cause operation of the clutches.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claim:

What is claimed is:

Apparatus for punching a tape, having timing indicia thereon comprising, in combination, a cylinder mounted for rotation and adapted to engage said tape about its peripherial surface and having circumferential grooves about its periphery, means feeding a tape around said cylinder, a plurality of punches, each mounted for movement into and out of a respective one of said grooves in said cylinder and for pivotal movement with respect to direction of movement of said tape and effective to perforate said tape upon entry in a respective one of said grooves, a plurality of pairs of first and second electro-adhesive clutches operable in response to electrical pulses, means coupling each of said punches to one of said pairs of clutches for movement of each respective punch into its groove when its first clutch is operated and movement in the opposite direction out of said groove when its second clutch is operated, and selectively operable means synchronized with said indicia on said tape for sequentially providing pulses to pairs of said first and second clutches.

References Cited in the file of this patent

UNITED STATES PATENTS

| | | |
|---|---|---|
| 2,025,123 | Rahbek | Dec. 24, 1933 |
| 2,648,385 | DeBoo | Aug. 11, 1953 |
| 2,746,548 | Paris et al. | May 22, 1956 |
| 2,850,907 | Foster | Sept. 9, 1958 |
| 2,850,908 | Foster | Sept. 9, 1958 |